United States Patent [19]

Gibson

[11] 3,851,122

[45] Nov. 26, 1974

[54] PATH VERIFICATION ARRANGEMENT FOR AUTOMATICALLY TESTING CONDITIONS

[75] Inventor: John C. Gibson, Oak Lawn, Ill.

[73] Assignee: GTE Automatic Electric Laboratories Incorporated, Northlake, Ill.

[22] Filed: Jan. 17, 1974

[21] Appl. No.: 437,595

Related U.S. Application Data

[63] Continuation of Ser. No. 268,986, July 5, 1972, abandoned.

[52] U.S. Cl. .......................................... 179/175.23
[51] Int. Cl. ............................................ H04m 3/24
[58] Field of Search.... 179/175.2 R, 175.21, 175.23

[56] References Cited

UNITED STATES PATENTS

| | | | |
|---|---|---|---|
| 2,945,211 | 7/1960 | Gibson et al. | 340/147 |
| 3,488,459 | 1/1970 | Kohler | 179/175.2 R |
| 3,500,001 | 3/1970 | Lewen et al. | 179/175.2 R |
| 3,555,208 | 1/1971 | Arndt | 179/175.23 |
| 3,578,916 | 5/1971 | Lucas | 179/175.2 R |

*Primary Examiner*—Kathleen H. Claffy
*Assistant Examiner*—Douglas W. Olms

[57] ABSTRACT

A path verification arrangement wherein the connections established through a switching matrix are tested, and the faults are detected and the fault locations are identified, by the same marker that establishes the connections through the switching matrix. It is suggested that diagnostic tests may be conducted at the time a fault condition is encountered, and isolation action may take place automatically, in order to prevent the fault from affecting other calls.

1 Claim, 5 Drawing Figures

PATH VERIFICATION ARRANGEMENT FOR AUTOMATICALLY TESTING CONDITIONS

This is a continuation, of application Ser. No. 268,986, filed July 5, 1972 now abandoned.

BACKGROUND OF THE INVENTION

This invention relates to telephone switching systems and, more particularly, to a path verification arrangement for automatically testing connections through a switching matrix, and for detecting faults and identifying the fault locations.

The verification of a complete connection between a network inlet and outlet to determine that it is free of fault is of prime importance. Without such a path verification, it may be very difficult, in some cases impossible, for the connecting circuits to detect or report fault conditions within the switching network. Two of the most important reasons for path verification are to detect and report fault conditions so that remedial action can be taken and to minimize the effect of a fault by isolating it from succeeding calls until remedial action is taken. In order to satisfy the latter, the path verification must take place when the connection is being established.

FIELD OF THE INVENTION

In the particular illustrated embodiment, the switching network is a four stage matrix, with a minimum of 10 paths between any particular inlet and outlet. Each path has three sections, namely, an A–B link, a junctor and a C–D link. In order to use a path, all three sections must be idle. A marker, or common control circuit, establishes and controls the connections through the switching matrix. In the path selection, the marker tests the three sections of all ten paths at the same time, choosing the first path with all three sections idle. The connections established through the switching matrix are tested, and the faults are detected and the fault locations are identified, by the same marker that establishes the connections through the switching matrix. The marker, in addition, takes appropriate action to remove the faulty apparatus from service. The marker will have detailed information for reporting fault conditions to trouble recording apparatus, and therefore is advantageously used to perform these functions. The path verification arrangement requires the use of one inlet or vertical row of crosspoints in the first or A stage and one outlet or vertical row of crosspoints in the last or D stage of the switching matrix, and a pair of busses multipled to these inlets and outlets, to bring both ends of the path back to the marker.

The arrangement has several novel features, including the feature that when a path verification test fails, the marker performs a diagnostic test to determine the type of fault and its location within the path connection. In particular, the fault is identified as an open, reverse, cross or short, false closure or false potential and the like; and once the nature of the fault is known, the marker makes appropriate diagnostic test connections to narrow the location of the fault, to the extent possible. After the type and the location of a fault is identified, the fault is isolated to prevent it from interfering with succeeding calls, by making the crosspoint or path appear busy. To do this, the circuit at either end of the connection or path, or both, can be held in an "out-of-service" condition.

The marker, having determined the type and location of the fault, provides detailed information regarding the fault to the trouble recording apparatus, including the action taken to isolate the fault. Pinpointing the fault type and location permits the simplest form of trouble recording, thereby avoiding undue amounts of decoding, translating, analyzing and theorizing on the part of maintenance people.

The same capabilities that enable a marker to make diagnostic connections in a manner that will determine the location of a fault permits test calls that are manually initiated from a test center to be directed to particular paths and crosspoints. This test feature is particularly useful in checking repairs, and in making repeated tests to the same path or crosspoint to check intermittent failures. Also, when coupled with an automatic progressive feature, it is very useful in debugging newly installed networks or to check new junctors and patterns after an addition.

The arrangement differs from previous arrangements in that diagnostic tests are conducted at the time a fault condition is encountered. In this way, the location of the fault is identified and this, in turn, will indicate what action must take place in order to prevent the fault from effecting other calls. Whenever possible, isolation action will take place automatically.

Accordingly, it is an object of the present invention to provide an improved path verification arrangement for automatically testing connections established through a switching matrix.

A further object is to provide a path verification arrangement including means for detecting faults and identifying the fault location.

A still further object is to provide a path verification arrangement as described above, further including means for automatically taking appropriate action to remove the faulty apparatus from service.

Still another object is to provide a path verification arrangement of the above-described type wherein the test, diagnostic and make-busy functions are performed by the same marker that makes the connections through the switching matrix.

Still another object is to provide a path verification arrangement as described, wherein the diagnostic tests are conducted at the time a fault condition is encountered.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings, in which.

DESCRIPTION OF PREFERRED EMBODIMENT

Figure 1:
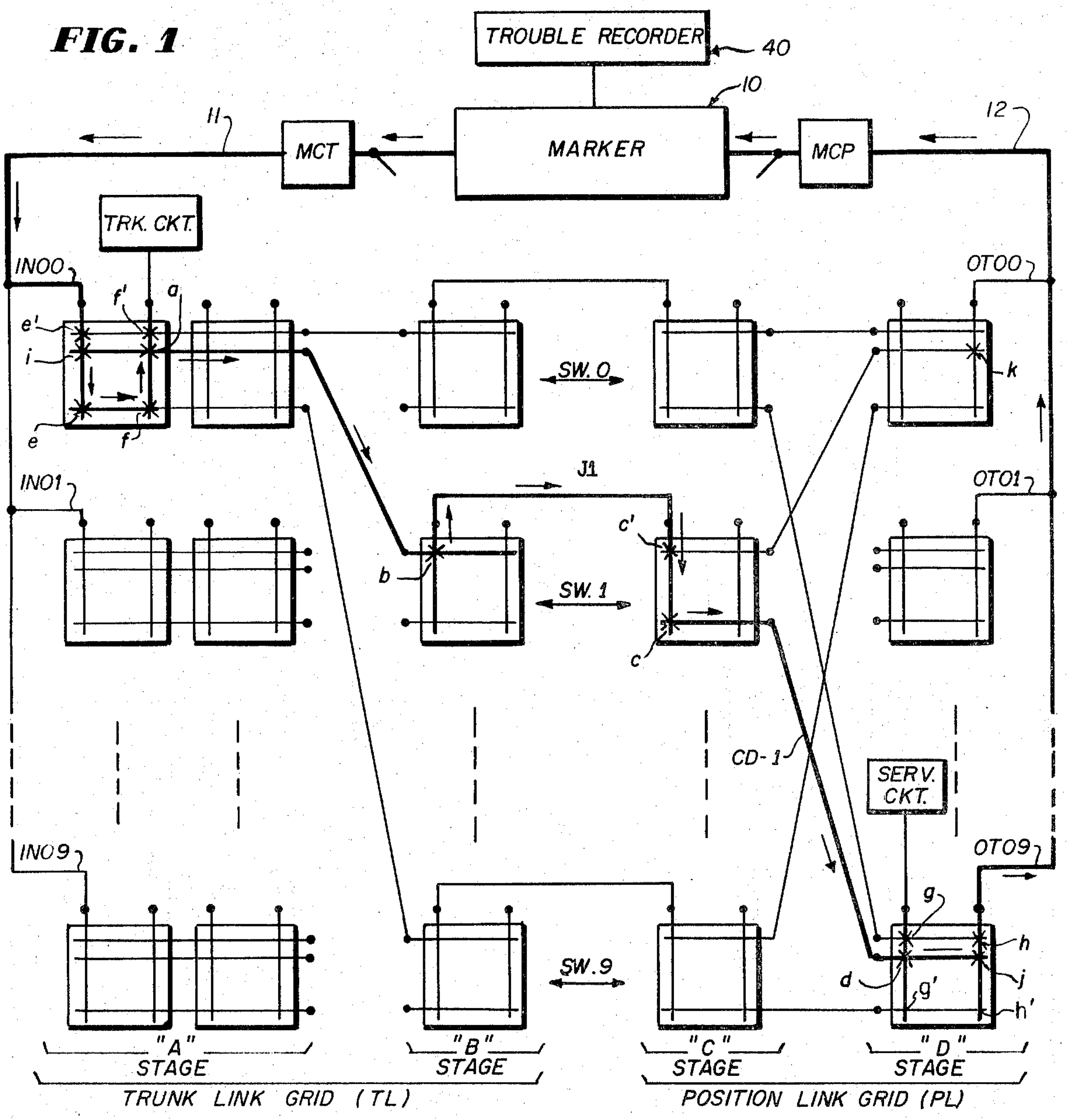
FIG. 1 is a schematic block diagram illustrating the path verification arrangement of the invention.
Figure 5:
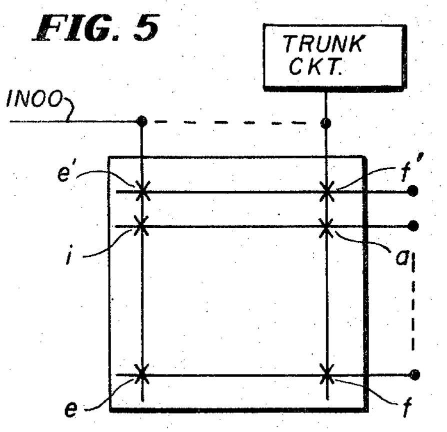
FIGS. 4 and 5 are block diagrams of the last or D stage and the first or A stage, respectively, generally illustrating the diagnostic tests performed.
Figure 4:
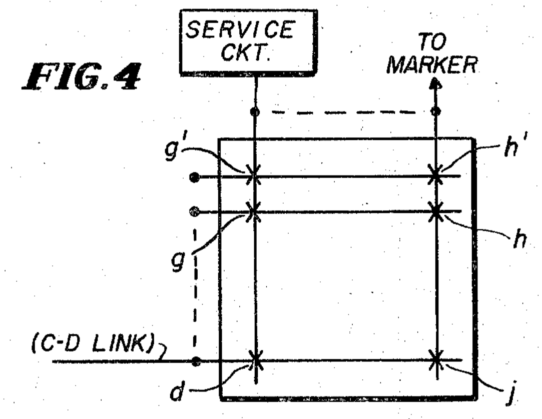

Referring now to the drawings, in FIG. 1 there is illustrated a switching matrix for a telephone switching system. As illustrated, the switching matrix comprises ten switches SW0–SW9, each of which is formed of four stages A, B, C AND D, consisting of crosspoint reed relay matrix assemblies. For further description of the crosspoint reed relay matrix assemblies, the following United States patents may be referred to:

U.S. Pat. No. 3,188,423 E. J. Glenner and K. K. Spellnes "Crosspoint Switching Arrays"

U.S. Pat. No. 3,128,356 J. S. Lychyk and A. Taliste "Dry Reed Relays"

U.S. Pat. No. 3,193,731 P. K. Gerlach, G. J. David, R. O. Stoehr "Printed Matrix Board Assembly"

The A and B stages form a trunk link grid (T-L grid) and the C and D stages form a position link (P-L grid). The verticals of the A stages form the inlets of the switching matrix, and these inlets or verticals may have circuits such as the trunk circuit 40 coupled to them. Each A stage has ten outlets or horizontals which are coupled via the A–B links to the horizontal or inlets to the B stages. The inlets or verticals of the A stage have common access to all horizontals. The verticals or outlets of the B stage have common access to all horizontals and are coupled via the junctors to the verticals or the inlets of the C stages. Verticals of the C stages likewise have common access to all the horizontals or outlets of the C stages, and the latter are coupled via the C–D links to the horizontals or inlets of the D stages. The verticals of the D stages (six per switch) also have common access to all the horizontals, and form the outlets. The A–B links, the junctors and the C–D links are connected so as to provide a minimum of ten paths between any particular inlet and outlet of the switching matrix. Connections through the switching matrix are established and controlled by a marker or markers 10, in the manner generally disclosed in U.S. Pat. No. 3,293,368, D. R. Wedmore, "Marker for a Communication Switching Network," and reference may be made to the latter for a detailed description of the marker operation in establishing these connections. The path verification arrangement requires the use of one inlet or vertical in each switch in the A stage of the T-L grid, and one outlet or vertical in each switch in the D stage of the P-L grid, and these inlets and outlets are connected to the marker for path verification, via the two multiples or busses 11 and 12 and the marker connect relays MCT and the marker connect relays MCP.

In operation, the marker establishes a connection or transmission path between the trunk circuit 20 and the service circuit 30 by closing crosspoint *a*, *b*, *c* and *d* in the A, B, C and D stages, respectively, thus establishing a path through these stages and the link A-B1, the junctor J1, and the link C-D1. At the same time, the marker establishes the path verification for the connection by closing crosspoints *e*, *f*, *g* and *h*, thus establishing a continuous path from the marker 10, through the switching matrix and back to the marker, via the multiple or buss 11, the marker connect relays MCT, the inlet 1N00, the transmission path established through the A, B, C and D stages, the outlet 0T00, the marker connect relays MCP, and the multiple or buss 12, via the path indicated by the arrows thereon.

Figure 2:
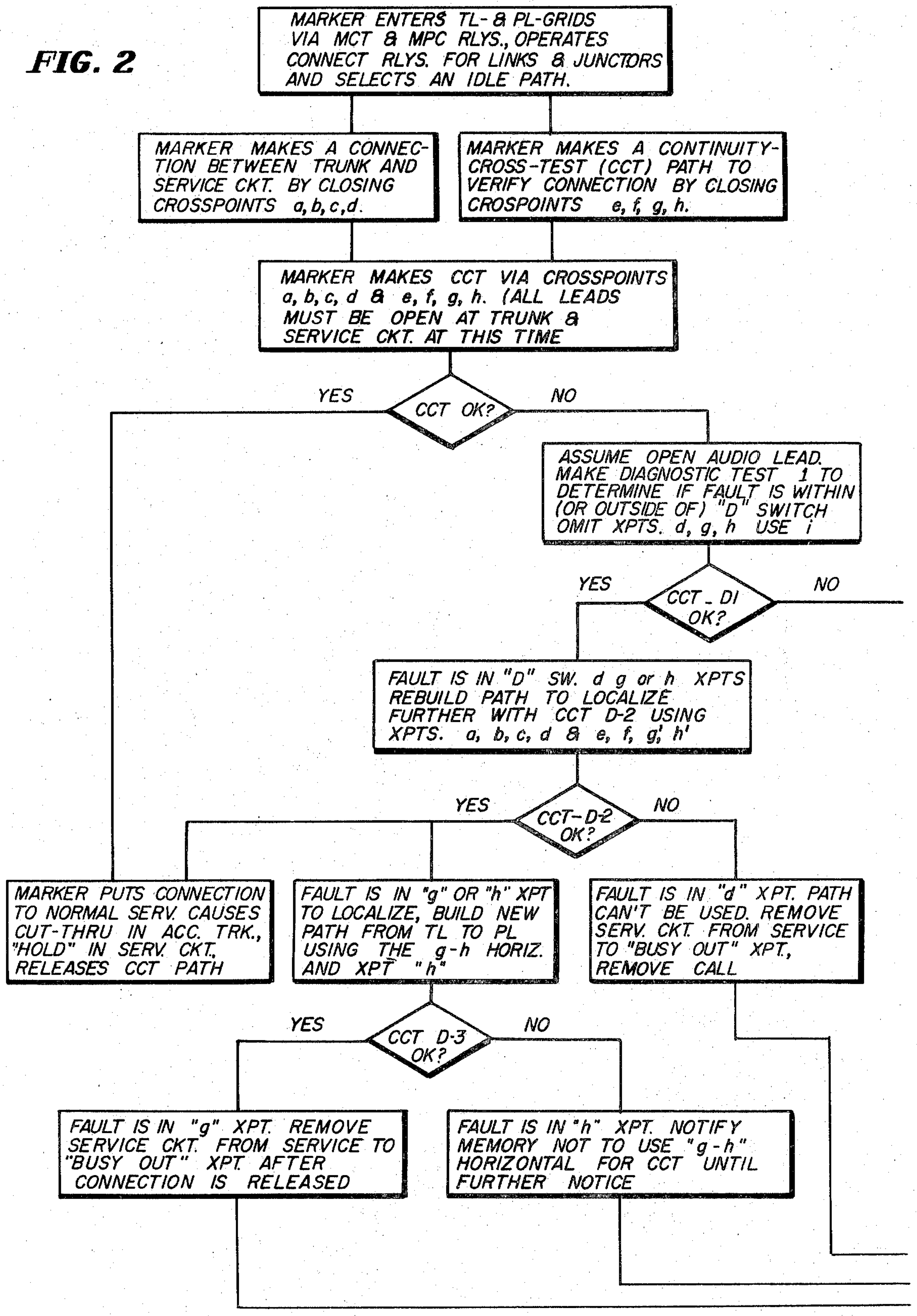
FIGS. 2 and 3 are a flow diagram of the diagnostic test performed to identify and locate a fault.

Referring to the flow chart in FIG. 2, it can be seen that after establishing the verification path, the marker makes a continuity and cross test (CCT) to verify continuity and detect any opens, reverses, crosses or shorts, or false potentials. If the results of the test indicate a valid connection, the path verification crosspoints *e*, *f*, *g* and *h* are released, and the connection crosspoints *a*, *b*, *c* and *d* are held for the duration of the connection under the control of the service circuit 30.

If the path verification test fails, the marker will:

1. make diagnostic test to determine the location of the fault;

2. busy out equipment as follows, depending on fault location:

a. if the fault is in the A stage trunk vertical, busy out the trunk circuit and release the connection;

b. if the fault is in the D stage service vertical, busy out the service circuit and release the connection;

c. if the fault is in the B or C stages, re-establish the original connection path and busy out the trunk and service circuit to hold the connection.

3. provide details of the fault condition to the trouble recording apparatus 40. The action described in paragraph (2) above takes place as the diagnostic tests are performed, when the fault is encountered. When equipment is removed from service, the one call involved with the fault condition will receive "busy tone" without proceeding, but the automatic removal from service of faulty equipment will allow all other circuits in the system to function without being interrupted by the same fault. It is important for the marker to make diagnostic tests of a fault before taking further action because (*a*) the fault can then be isolated by removing a minimum amount of equipment; (*b*) the connection might be possible via an alternate path; (*c*) the fault location is identified for the trouble record. Method of Making Diagnostic Tests of Fault Assume that the path verification in the marker indicates a lack of continuity on one of the transmitting leads of the path. The objective is then to determine where the path is open. The D stage is checked first for several reasons:

1. If the fault is in the D stage, an alternate path or service circuit in the same matrix can be obtained with a minimum amount of time and effort.

2. Due to the size of the D stage matrix (5 verticals times 10 horizontals, plus 1 vertical for path verification) there are always excess idle horizontals. In the worst case, a connection to the last idle service circuit in a switch matrix would mean that there are already four other connections to the same switch matrix which were previously established. These four connections would use four of the ten horizontals of the switch matrix, leaving six horizontals available for the last (fifth) connection. Three idle horizontals are required for (*a*) the connection, (*b*) the path verification and (*c*) a diagnostic test.

Figure 3:
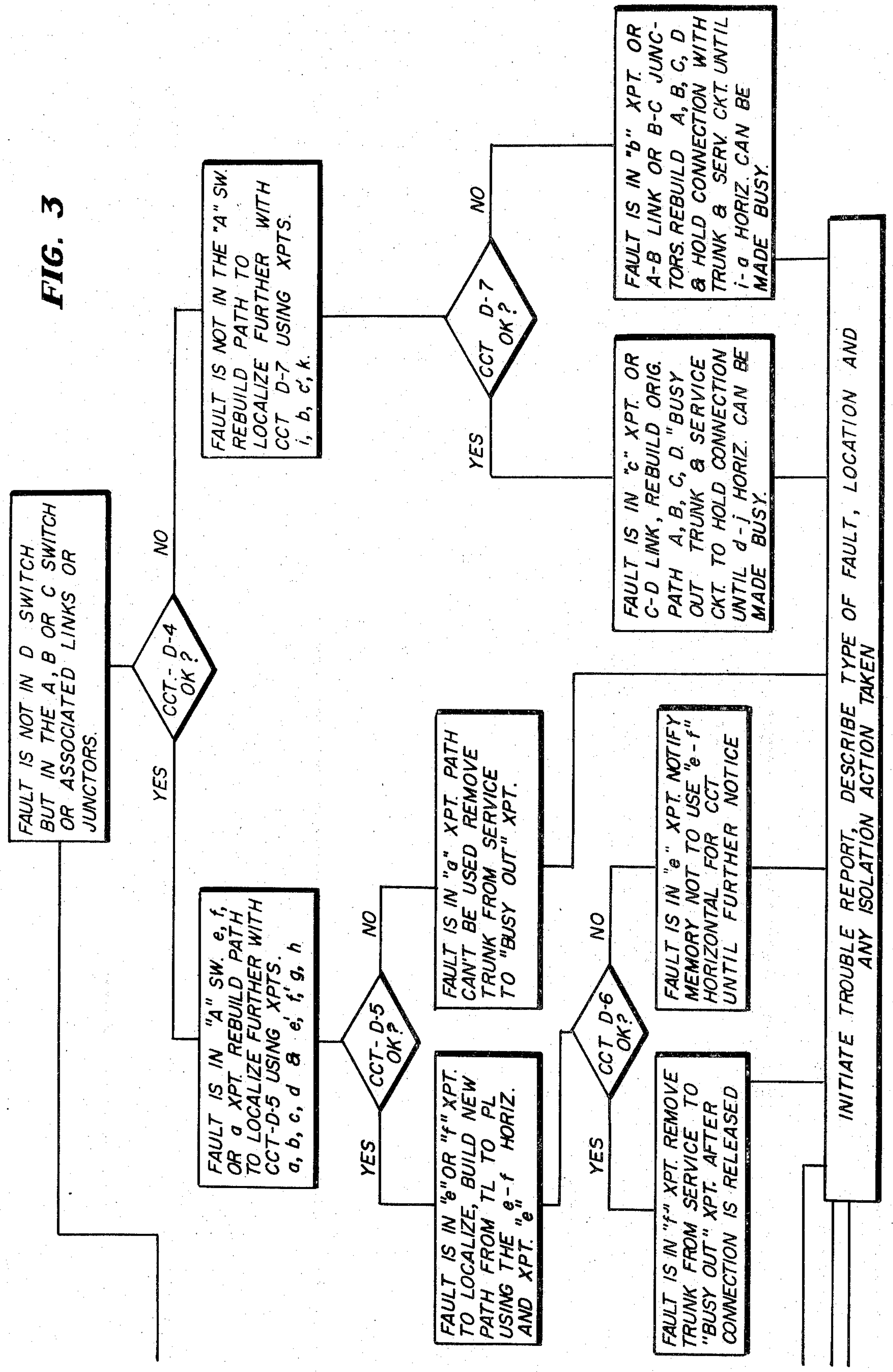

3. If the connection is to a circuit that has two appearances, it may be desirable to transfer to the other appearance in another grid. The D stage switch matrix is shown in FIG. 3 and, as illustrated, the connection crosspoint *d* and the path verification crosspoints *g* and *h* are closed by the marker 10. The fault (open continuity) may be in any of these three crosspoints in this D stage, so the marker first determines whether the fault is "in" or "out" of the D stage by making diagnostic test 1.

To do this, the entire connection is released and then re-established using the same crosspoints, links and junctor in stages A, B and C, but in stage D, crosspoint *j* is closed instead of *d*, *g* and *h*. This will put the path verification vertical directly onto the switch matrix horizontal of the selected C–D link, and the path verification test is now repeated in the marker.

If this path verification test also fails, it indicates that the fault is not within the D stage switch, but at some other location in the connection. Diagnostic tests then are made in the A stage, as described more fully below.

If, however, this second path verification test does not fail, but test OK, then it indicates that the fault is in one of the three crosspoints *d*, *g* or *h*. In this case, diagnostic test 2 is made to further localize the fault. The diagnostic test 2 is made by the marker again releasing the entire connection and then re-establishing it using the same path except for the crosspoint *j*. Instead, the crosspoints *d*, *g'* and *h'* are closed. The path verification test is now repeated and if it fails, the fault is at the crosspoint *d*. If the test does not fail, then the fault is at crosspoint *g* or *h*.

Action Taken if Fault is at Crosspoint *d*

If the fault is at crosspoint *d*, a proper connection cannot be made between this particular path and service circuit. Accordingly, depending upon other circuit conditions and capabilities, one of several courses of action are taken, in the following order of preference:

1. If there is an idle path that can be used for the connection between the same circuits, it is used and the marker is instructed to put the service circuit in a "trouble out-of-service" condition after it finishes serving the call and becomes idle. This action prevents other calls from encountering the same fault.
2. If there is no other idle path that can be used for the connection between the same circuits, then the service circuit is put in a "trouble out-of-service" condition, and the call is re-routed to another service circuit as an alternate choice, if this can be done.
3. Means are provided on a "per grid basis" for the path verification that simulates a trunk in the A stage and a service circuit in the D stage. These means hold a connection using the *j* crosspoint. These means prevent a succeeding call from encountering the faulty crosspoint, by reducing the paths from 10 to 9 for all service circuits in the same D stage switch matrix. It also causes the path verification test in these grids to be cancelled until the connection is released.

In all of the three above-mentioned cases, the service circuit (or connection) can be released to return to service, by providing means so that the maintenance personnel can "make busy" the C–D link path associated with the faulty crosspoint until the fault is eliminated.

Whenever any equipment is automatically taken out of service, its identity is included in the corresponding trouble report, and appropriate status and alarm signals are provided. In order to expedite the action described in paragraph (2) above, the marker can be given two idle service circuits of the same type within the same grid. In this fashion, the markers already have the particulars on the alternate choice circuit if trouble is encountered in attempting to use the first choice circuit. This arrangement also has an advantage if blocked conditions are encountered during high traffic periods.

Action Taken if Fault is at Crosspoint *g* or *h*

If the diagnostic path verification test 2 using crosspoints *d*, *g'* and *h'* does not fail, the fault is at crosspoint *g* or *h*. At this time, the marker conducts diagnostic test 3 to determine if the fault is at crosspoint *g* or *h*.

In conducting diagnostic test 3, the entire connection is released and then re-established using crosspoint *h* at the D stage. If the path verification test fails, the fault is at the crosspoint *h* and this horizontal is placed in "trouble out-of-service" condition for path verification tests.

If the test does not fail, the fault is at the crosspoint *g*. In such a case, the service circuit is taken out of service and placed in a "trouble out-of-service" condition, after the service circuit finishes servicing the call, to prevent other calls from encountering the same fault.

Action Taken if Fault is not in the D Stage

If, as indicated above, the first diagnostic test fails, the fault is not in the D stage, but at some other location in the connection. In such a case, the diagnostic tests next are made in the A stage to isolate the fault. These diagnostic tests are performed in essentially the same manner as outlined above for the D stage, until the fault is determined to be outside of the A stage or, alternatively, the fault is isolated to the extent possible within the A stage. If the fault is determined to be within the A stage, the kind and location of the fault is identified to the trouble recorder, and the appropriate action taken to remove the faulty equipment from service.

More specifically, referring again to the flow chart, the marker determines whether the fault is "in" or "out" of the A stage by making diagnostic test 4. The entire connection is released and then re-established using the same crosspoints, links and junctor in stages B, C and D, but in stage A, crosspoint *i* is closed instead of *e* and *f*. This will put the path verification vertical directly onto the switch matrix horizontal of the selected A–B link, and the path verification test is now repeated in the marker.

If this path verification test fails, it indicates that the fault is not within the A stage switch, but at some other location in the connection. Other diagnostic tests then are made, as described more fully below.

If this path verification test does not fail, then the fault is in one of the crosspointes *e*, *f* or *a*. Diagnostic test 5 then is made by the marker rebuilding the connection using crosspoints *e'* and *f'*. The path verification test is repeated and, if it fails, the fault is at the crosspoint a. If the test does not fail, then the fault is at crosspoint *e* or *f*.

Action Taken if Fault is at Crosspoint a

If the fault is at crosspoint a, a proper connection cannot be made between the trunk circuit and this particular path. The trunk circuit then is removed from service to "busy out" the crosspoint *a*, with the fault being identified and the action taken being reported to the trouble recorder 40.

Action Taken if Fault is at Crosspoint *e* or *f*

The connection again is released and rebuilt using the *e–f* horizontal and crosspoint *e*, and the path verification test repeated by the marker. If this test does not fail, the fault is at the *f* crosspoint, and the trunk circuit is removed from service to "busy out" the *f* crosspoint, after the connection is released.

If the test fails, the fault is at the crosspoint *e*, and this *e–f* horizontal is placed in "trouble out-of-service" condition for path verification tests.

Action Taken if Fault is not in the A Stage

If, after determining that the fault is not in the A stage or D stage, the fault must exist in either the B or C stage, or in the junctor J1 or links connecting them. In such a case, only two crosspoints, two links and the junctor J1 are involved.

One additional path verification test then is conducted, by re-building the connection using crosspoints *i*, *b*, *c'* and *k*. If this test fails, the fault is in crosspoint *b*, or the A–B link, or the B–C junctor. In such a case, the connection is re-built with the *a*, *b*, *c* and *d* crosspoints, and the connection is held with the trunk and service circuits until the *i–a* horizontal of the A stage switch (and junctor) can be made "busy."

If the path verification test does not fail, the fault is in crosspoint *c*, or the C–D link. In this case, the connection is re-built using the crosspoints *a*, *b*, *c* and *d*, and the trunk and service circuits are made "busy" to hold the connection until the *d–j* horizontal of the D stage switch can be made "busy."

It will thus be seen that the objects set forth above, among those made apparent from the preceding description, are efficiently attained and certain changes may be made in the above construction. Accordingly, it is intended that all matter contained in the above description or shown in the accompanying drawings shall be interpreted as illustrative and not in a limiting sense.

Now that the invention has been described, what is claimed as new and desired to be secured by Letters Patent is:

1. A path verification method for automatically testing connections established through a switching matrix which comprises a plurality of switches, each of which is formed of a plurality of stages consisting of crosspoint switching matrices and a plurality of links and junctors connecting said stages to provide a plurality of transmission paths between any particular trunk circuit inlet and service circuit outlet thereof under the control of a marker, the first and last stage of each of said switches having at least one vertical thereof forming a verification inlet and a verification outlet, respectively, said marker being operable to establish a transmission path between any trunk circuit inlet and any service circuit outlet by closing selected ones of said crosspoints in respective ones of said plurality of stages comprising the steps of coupling said marker in multiple to one verification inlet of each of the first stages of each of said switches and to one verification outlet of each of the last stages of said switches, operating said marker to close selected ones of said crosspoints in said first and last stages to establish a path verification circuit from said marker through said switching matrix back to said marker via said one verification inlet and a trunk circuit inlet of said first stage, said one verification outlet and a service circuit outlet of said last stage and the same transmission path established through said switching matrix, testing by said marker the continuity of the established path verification circuit.

* * * * *